United States Patent
Sugino et al.

(10) Patent No.: US 8,951,641 B2
(45) Date of Patent: Feb. 10, 2015

(54) ACTUATOR ELEMENT INCLUDING FAT AND OIL OR WATER REPELLENT

(75) Inventors: Takushi Sugino, Ikeda (JP); Kinji Asaka, Ikeda (JP); Isao Takahashi, Tokyo (JP); Tomomasa Takatsuka, Tokyo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 187 days.

(21) Appl. No.: 13/542,097

(22) Filed: Jul. 5, 2012

(65) Prior Publication Data

US 2013/0008160 A1  Jan. 10, 2013

(30) Foreign Application Priority Data

Jul. 6, 2011  (JP) .................................. 2011-149729

(51) Int. Cl.
| | |
|---|---|
| *F01B 29/10* | (2006.01) |
| *B32B 27/08* | (2006.01) |
| *B32B 27/18* | (2006.01) |
| *B32B 27/30* | (2006.01) |
| *B32B 27/32* | (2006.01) |

(52) U.S. Cl.
CPC ................ *F01B 29/10* (2013.01); *B32B 27/08* (2013.01); *B32B 27/18* (2013.01); *B32B 27/304* (2013.01); *B32B 27/308* (2013.01); *B32B 27/322* (2013.01); *B32B 2457/00* (2013.01)
USPC ........................... 428/411.1; 428/421; 60/527

(58) Field of Classification Search
None
See application file for complete search history.

(56) References Cited

U.S. PATENT DOCUMENTS

| | | | |
|---|---|---|---|
| 2005/0034987 A1* | 2/2005 | Zhou et al. | 204/426 |
| 2006/0257645 A1* | 11/2006 | Asaka et al. | 428/323 |
| 2008/0023396 A1* | 1/2008 | Fugetsu | 210/502.1 |
| 2008/0044651 A1* | 2/2008 | Douglas | 428/339 |

FOREIGN PATENT DOCUMENTS

JP   2005-176428 A   6/2005

* cited by examiner

*Primary Examiner* — Callie Shosho
*Assistant Examiner* — Patrick English
(74) *Attorney, Agent, or Firm* — Westerman, Hattori, Daniels & Adrian, LLP (57) ABSTRACT

A conductive thin film is composed of a polymer gel including carbon nanotubes, an ionic liquid, and a polymer. At least one selected from the group consisting of fat and oil and a water repellent is included in the polymer gel or in a surface of the polymer gel.

6 Claims, 11 Drawing Sheets

COMPARATIVE EXAMPLE 1

DISPLACEMENT IN FORWARD DIRECTION AND THEN QUICK RETURN WITH REVERSE DISPLACEMENT

THREE-LAYER ELEMENT: THICKNESS OF ELEMENT=107 μm

CNT(50), EMIBF4×1 REFERENCE FILM
ELECTROLYTIC FILM EMIBF4=50wt%

TIME (s)

FIG. 6C

EXAMPLE 4

LARGE AMOUNT OF DISPLACEMENT IN
FORWARD DIRECTION WITHOUT RETURN
AND REVERSE DISPLACEMENT

THREE-LAYER ELEMENT: THICKNESS OF ELEMENT=132 μm

CNT(50), EMIBF4×1 REFERENCE FILM
ELECTROLYTIC FILM EMIBF4=1wt%

TIME (s)

FIG. 6D

EXAMPLE 5

LARGE AMOUNT OF DISPLACEMENT IN FORWARD DIRECTION WITH SMALL AMOUNT OF RETURN AND WITHOUT REVERSE DISPLACEMENT

THREE-LAYER ELEMENT: THICKNESS OF ELEMENT=103 μm

CNT(50), EMIBF4×1 REFERENCE FILM
ELECTROLYTIC FILM EMIBF4=2wt%

TIME (s)

EXAMPLE 7

LARGE AMOUNT OF QUICK DISPLACEMENT IN FORWARD DIRECTION WITH LARGE AMOUNT OF RETURN AND WITHOUT REVERSE DISPLACEMENT

THREE-LAYER ELEMENT: THICKNESS OF ELEMENT=116 μm

CNT(50), EMIBF4×1 REFERENCE FILM
ELECTROLYTIC FILM EMIBF4=10wt%

TIME (s)

ACTUATOR ELEMENT INCLUDING FAT AND OIL OR WATER REPELLENT

CLAIM OF PRIORITY

This application claims benefit of Japanese Patent Application No. 2011-149729 filed on Jul. 6, 2011, which is hereby incorporated by reference.

BACKGROUND OF THE INVENTION

1. Field of the Invention

The present invention relates to a conductive thin film, an electrolytic film, a layered body of the films, and an actuator element. The actuator element herein is an actuator element that is driven through an electrochemical process such as an electrochemical reaction or the charge and discharge of an electric double layer.

2. Description of the Related Art

An actuator element that uses a gel of carbon nanotubes and an ionic liquid as a conductive active layer with elasticity has been proposed as an actuator element that can operate in air or vacuum (refer to Japanese Unexamined Patent Application Publication No. 2005-176428).

General actuator elements have a structure in which an ionic liquid gel serving as an electrolytic layer is sandwiched between electrode layers including carbon nanotubes, an ionic liquid, and a polymer. Such an actuator element is excellent in terms of quick deformation, but the amount of deformation is decreased after a voltage is applied for a long time.

SUMMARY OF THE INVENTION

To further improve the functions of an actuator element, the present invention provides an actuator element which provides a large amount of deformation and in which the amount of deformation is not significantly changed even after a voltage is applied for a long time.

As a result of thorough studies, the inventors of the present invention have found that, by providing at least one selected from the group consisting of fat and oil and a water repellent in a conductive thin film and an electrolytic film that constitute an actuator element or at an interface between the conductive thin film and the electrolytic film, a decrease in the amount of deformation (return after deformation) is suppressed and the maximum displacement is increased. They also have found that, by adjusting the content of an ionic liquid in an electrolytic film including the ionic liquid and a polymer, a decrease in the amount of deformation (return after deformation) is suppressed and the maximum displacement is increased.

The present invention provides the following conductive thin film, electrolytic film, layered body including the films, and actuator element.

According to an aspect of the present invention, a layered body includes at least one conductive thin film composed of a polymer gel including carbon nanotubes, an ionic liquid, and a polymer and at least one electrolytic film including an ionic liquid and a polymer, the electrolytic film being stacked on the conductive thin film. At least one selected from the group consisting of fat and oil and a water repellent is included in the polymer gel or in a surface of the polymer gel.

The fat and oil may be selected from the group consisting of salad oil, shirashime oil, corn oil, soybean oil, sesame oil, rapeseed oil, rice oil, rice-bran oil, camellia oil, safflower oil, palm kernel oil, coconut oil, cottonseed oil, sunflower oil, perilla oil, olive oil, peanut oil, almond oil, avocado oil, hazelnut oil, walnut oil, grape seed oil, mustard oil, lettuce oil, fish oil, whale oil, shark oil, cod-liver oil, a glycerol fatty acid ester, a polyglycerol fatty acid ester, a sucrose fatty acid ester, an ethylene fatty acid ester, a propylene glycol fatty acid ester, a sorbitan fatty acid ester, a polyoxyethylene fatty acid ester, a polyoxyethylene sorbitan fatty acid ester, a polyoxyethylene sorbitol fatty acid ester, a polyoxyethylene lanolin fatty acid ester, a trimethylolpropane fatty acid ester, beeswax, rice wax, hydrogenated fat and oil, a polyglycerol condensed (poly)ricinoleic acid ester, phospholipid, lecithin, egg yolk lecithin, lysolecithin, soybean lecithin, an organic acid monoglyceride, a polyoxyethylene alkyl ether, polyoxyethylene castor oil, sodium stearoyl lactate, calcium stearoyl lactate, saponin, quillaia saponin, succinic acid monoglyceride, and succinic acid diglyceride.

The water repellent may be at least one selected from the group consisting of fluorine-based oil, fluorosilicone oil, and silicone oil.

The conductive thin film may further include a conductive aid.

The conductive aid may be selected from the group consisting of a conductive polymer, carbon particles, and an inorganic mesoporous material.

According to another aspect of the present invention, a layered body includes at least one conductive thin film composed of a polymer gel including carbon nanotubes, an ionic liquid, and a polymer and at least one electrolytic film including an ionic liquid and a polymer, the electrolytic film being stacked on the conductive thin film. At least one selected from the group consisting of fat and oil and a water repellent is included in the electrolytic film or in a surface of the electrolytic film.

According to another aspect of the present invention, a layered body includes at least one conductive thin film composed of a polymer gel including carbon nanotubes, an ionic liquid, and a polymer and at least one electrolytic film including an ionic liquid and a polymer, the electrolytic film being stacked on the conductive thin film. At least one selected from the group consisting of fat and oil and a water repellent is included in an interface between the conductive thin film and the electrolytic film.

According to another aspect of the present invention, an actuator element includes one of the layered bodies described above.

According to the present invention, an actuator element in which the return after deformation is suppressed and the degree of expansion and contraction and a force to be generated are improved can be provided by using fat and oil and/or a water repellent or setting the content of an ionic liquid in an electrolytic film in a certain range.

DESCRIPTION OF THE PREFERRED EMBODIMENTS

In the present invention, fat and oil and/or a water repellent is used in at least one of a conductive thin film and an electrolytic film of an actuator element. The conductive thin film used as an electrode layer of the actuator element includes carbon nanotubes, a polymer, and an ionic liquid and furthermore may include fat and oil and/or a water repellent. The electrolytic film includes a polymer and an ionic liquid and furthermore may include fat and oil and/or a water repellent.

Examples of the fat and oil used in the present invention include fatty oils such as salad oil, shirashime oil (refined oil), corn oil, soybean oil, sesame oil, rapeseed oil, rice oil, rice-bran oil, camellia oil, safflower oil, palm kernel oil, coconut oil, cottonseed oil, sunflower oil, perilla oil, olive oil, peanut oil, almond oil, avocado oil, hazelnut oil, walnut oil, grape seed oil, mustard oil, lettuce oil, fish oil, whale oil, shark oil, and cod-liver oil; fats which are solid at ordinary temperature, such as cocoa butter, palm oil, lard, beef tallow, chicken fat, mutton tallow, horse fat, shortening, butterfat, butter, margarine, ghee, and hydrogenated oil; and lubricating oil, castor oil, grease, cutting oil, glycerol fatty acid esters, polyglycerol fatty acid esters, sucrose fatty acid esters, ethylene fatty acid esters, propylene glycol fatty acid esters, sorbitan fatty acid esters, polyoxyethylene fatty acid esters, polyoxyethylene sorbitan fatty acid esters, polyoxyethylene sorbitol fatty acid esters, polyoxyethylene lanolin fatty acid esters, trimethylolpropane fatty acid esters, beeswax, rice wax, hydrogenated oils and fats, polyglycerol condensed (poly)ricinoleic acid esters, phospholipids, lecithin, egg yolk lecithin, lysolecithin, soybean lecithin, organic acid monoglycerides, polyoxyethylene alkyl ethers, polyoxyethylene castor oil, sodium stearoyl lactate, calcium stearoyl lactate, saponin, quillaia saponin, succinic acid monoglyceride, and succinic acid diglyceride. Fatty oils which are liquid at ordinary temperature are preferably used. Fat and oil which is solid at ordinary temperature can be used after liquefied by heating or after dissolved in a solvent or fatty oil containing an ionic liquid.

Examples of the water repellent include water-repellent components such as fluorine-based oils, fluorosilicone oils, silicone oils, fluorine-based urethane resins, silicone resins, and acrylic resins. To further maintain the water repellency, isopropyl alcohol or ethyl alcohol may be added to the water-repellent components.

Examples of the fluorine-based oil include perfluoropolyether polymers, chlorotrifluoroethylene polymers, and some of fluorohydrocarbon compounds. Specifically, Demnum S-20 (manufactured by DAIKIN INDUSTRIES, LTD.) and Daifloil #20 (manufactured by DAIKIN INDUSTRIES, LTD.) can be used as the fluorine-based oil.

The fluorosilicone oil has a structure in which polysiloxane has a fluoroalkyl group on its side chain or terminal. Specifically, FS-1265 (manufactured by Dow Corning Toray Co., Ltd.), X-22-819 (manufactured by Shin-Etsu Chemical Co., Ltd.), and FL100 (manufactured by Shin-Etsu Chemical Co., Ltd.) can be used as the fluorosilicone oil.

Examples of the silicone oil include dimethyl silicone oils, methyl chloride silicone oils, methylphenyl silicone oils, and organo-modified silicone oils. Specifically, PRX413, SF8417, SF8418, BY16-855B, SF8427, and SF8428 (these products are manufactured by Dow Corning Toray Co., Ltd.); and X-22-161C, KF-857, KP-358, and KP-359 (these products are manufactured by Shin-Etsu Chemical Co., Ltd.) can be used as the silicone oil. Oil such as silicone oil preferably has high water repellency and relatively low viscosity.

The fats and oils above may be used alone or in combination. The water repellents above may be used alone or in combination.

In a preferred embodiment of the present invention, fat and oil and/or a water repellent can be made to be present at an interface between the conductive thin film and the electrolytic film. Specifically, fat and oil and/or a water repellent is applied to a surface of the conductive thin film on the electrolytic film side and/or one surface or both surfaces (preferably both surfaces) of the electrolytic film. The conductive thin film and the electrolytic film are bonded to each other by compression bonding or the like. In other words, the conductive thin film and the electrolytic film are laminated, fabricated by thermal treating (heat-pressing), etc. Thus, a layer composed of the fat and oil and/or the water repellent can be made to be present at an interface between the conductive thin film and the electrolytic film. The fat and oil and/or the water repellent may be applied to both a surface of the conductive thin film and a surface of the electrolytic film and the obtained two layers may be stacked on top of one another. However, a layer of the fat and oil and/or the water repellent can be sufficiently made to be present by applying the fat and oil and/or the water repellent to only one of the surface of the conductive thin film and the surface of the electrolytic film.

The layer of the fat and oil and/or the water repellent may be formed on the entire contact portion between the conductive thin film and the electrolytic film or may be formed on only part of the contact portion, such as a central portion or a peripheral portion. The layer of the fat and oil and/or the water repellent is believed to restrict the movement of ions. Therefore, for example, the area (the entire contact portion or part of the contact portion) in which the layer of the fat and oil and/or the water repellent is formed and the thickness of the layer can be selected in consideration of increases in response speed and generated force and suppression of return after deformation. The layer of the fat and oil and/or the water repellent has a thickness of about 0.5 to 50 μm and preferably about 1 to 30 μm.

The fat and oil and/or the water repellent may be included in one of or both of the conductive thin film and the electrolytic film. In this case, the amount of the fat and oil and/or the water repellent added to each of the films is about 0.5% to 20% by mass and preferably about 1% to 10% by mass. If the amount is excessively large, the movement of ions is restricted and the response speed is decreased. If the amount is excessively small, no effect is produced.

The fat and oil and/or the water repellent may be dissolved or dispersed in one of or both of the conductive thin film and the electrolytic film.

The ionic liquid used in the present invention is also referred to as an ambient temperature molten salt or simply a molten salt. A molten salt is a salt which is in a molten state in a wide temperature range including ordinary temperature (room temperature), for example, at 0° C., preferably at −20° C., and more preferably at −40° C. The ionic liquid used in the present invention preferably has high ionic conductivity.

In the present invention, various publicly known ionic liquids can be used. Preferably, such ionic liquids are stable and in a liquid state at ordinary temperature (room temperature) or a temperature close to ordinary temperature. An ionic liquid preferably used in the present invention is composed of a cation (preferably an imidazolium ion or a quaternary ammonium ion) represented by one of general formulae (I) to (IV) below and an anion ($X^-$).

(I)

(II)

$[NR_xH_{4-x}]^+$  (III)

$[PR_xH_{4-x}]^+$  (IV)

In the general formulae (I) to (IV) above, R represents a linear or branched $C_1$ to $C_{12}$ alkyl group or a linear or branched alkyl group which has an ether linkage and in which the total number of carbon and oxygen atoms is 3 to 12. In the general formula (I), $R^1$ represents a linear or branched $C_1$ to $C_4$ alkyl group or a hydrogen atom, and R and $R^1$ are preferably different from each other. In the general formulae (III) and (IV), x is an integer of 1 to 4.

Examples of the linear or branched $C_1$ to $C_{12}$ alkyl group include a methyl group, an ethyl group, an n-propyl group, an isopropyl group, an n-butyl group, an isobutyl group, a sec-butyl group, a t-butyl group, a pentyl group, a hexyl group, a heptyl group, an octyl group, a nonyl group, a decyl group, an undecyl group, and a dodecyl group. The number of carbon atoms is preferably 1 to 8 and more preferably 1 to 6.

Examples of the linear or branched $C_1$ to $C_4$ alkyl group include a methyl group, an ethyl group, an n-propyl group, an isopropyl group, an n-butyl group, an isobutyl group, a sec-butyl group, and a t-butyl group.

Examples of the linear or branched alkyl group which has an ether linkage and in which the total number of carbon and oxygen atoms is 3 to 12 include $CH_2OCH_3$ and $(CH_2)_p(OCH_2CH_2)_qOR^2$ (p is an integer of 1 to 4, q is an integer of 1 to 4, and $R^2$ represents $CH_3$ or $C_2H_5$).

Examples of the anion ($X^-$) include a tetrafluoroborate ion ($BF_4^-$), $BF_3CF_3^-$, $BF_3C_2F_5^-$, $BF_3C_3F_7^-$, $BF_3C_4F_9^-$, a hexafluorophosphate ion ($PF_6^-$), a bis(trifluoromethanesulfonyl)imidate ion (($CF_3SO_2)_2N^-$), a perchlorate ion ($ClO_4^-$), a tris(trifluoromethanesulfonyl)methide ion (($CF_3SO_2)_3C^-$), a trifluoromethanesulfonate ion ($CF_3SO_3^-$), a dicyanamide ion (($CN)_2N^-$), a trifluoroacetate ion ($CF_3COO^-$), an organic carboxylate ion, and a halogen ion.

Specifically, the ionic liquid can be composed of a cation such as 1-ethyl-3-methylimidazolium ion or $[N(CH_3)(CH_3)(C_2H_5)(C_2H_4OC_2H_4OCH_3)]^+$ and an anion such as a halogen ion or a tetrafluoroborate ion. Two or more cations and/or anions may be used to further decrease the melting point of the ionic liquid.

A combination of a cation and an anion is not limited to the combination above, and any ionic liquid having an electrical conductivity of 0.1 $Sm^{-1}$ or more can be used.

The carbon nanotubes used in the present invention are a carbon material having a structure in which a graphene sheet is rolled in a tubular shape. Carbon nanotubes are broadly divided into single-walled carbon nanotubes (SWCNTs) and multi-walled carbon nanotubes (MWCNTs) in terms of the number of surrounding walls. Carbon nanotubes are also divided into chiral (helical) carbon nanotubes, zigzag carbon nanotubes, and armchair carbon nanotubes in terms of the structure of a graphene sheet. In the present invention, any type of carbon nanotubes can be used.

A preferred example of carbon nanotubes in practical use is HiPco (manufactured by Unidym) that can be mass produced from carbon monoxide, but is not limited thereto.

Examples of the polymer used in the present invention include copolymers of a perfluorinated olefin and a fluorinated olefin having a hydrogen atom, such as a polyvinylidene fluoride-hexafluoropropylene (PVDF(HFP)) copolymer; homopolymers of a fluorinated olefin having a hydrogen atom, such as polyvinylidene fluoride (PVDF); polytetrafluoroethylene (PTFE) and a tetrafluoroethylene-hexafluoropropylene (TFE(HFP)) copolymer; perfluorosulfonic acid (Nafion); poly(meth)acrylates such as poly-2-hydroxyethyl methacrylate (poly-HEMA) and polymethyl methacrylate (PMMA); polyethylene oxide (PEG); and polyacrylonitrile (PAN).

In a preferred embodiment of the present invention, the conductive thin film used as an electrode layer of an actuator element includes carbon nanotubes, an ionic liquid, a polymer, and fat and oil and/or a water repellent (in an inside or surface of the thin film).

The amounts of the carbon nanotubes, ionic liquid, and polymer added to the conductive thin film are 3% to 90% by mass, 5% to 80% by mass, and 4% to 70% by mass, respectively. Preferably, the amounts are 16.6% to 70% by mass, 15% to 73.4% by mass, and 10% to 68.4% by mass, respectively. More preferably, the amounts are 20% to 50% by mass, 20% to 69% by mass, and 11% to 64% by mass, respectively.

When the fat and oil and/or the water repellent is used in the conductive thin film, the fat and oil and/or the water repellent is added in an amount of 0.5 to 20 parts by mass and preferably 1 to 10 parts by mass relative to 100 parts by mass of the total amount of the carbon nanotubes, ionic liquid, and polymer.

When the fat and oil and/or the water repellent is used in the electrolytic film, the fat and oil and/or the water repellent is added in an amount of 0.1 to 20 parts by mass and preferably 1 to 10 parts by mass relative to 100 parts by mass of the total amount of the ionic liquid and polymer.

The above-described amount of the fat and oil and/or the water repellent added can also be employed as an amount of fat and oil and/or a water repellent used when the fat and oil and/or the water repellent is applied to form a film at an interface between the conductive thin film and the electrolytic film.

The electrolytic film needs to include the polymer, but does not necessarily include the ionic liquid.

When the fat and oil and/or the water repellent is used for an actuator element or a layered body including the conductive thin film and electrolytic film, the amounts of the ionic liquid and polymer added to the electrolytic film are 0% to 80% by mass and 20% to 100% by mass, respectively. Preferably, the amounts are 0.5% to 60% by mass and 40% to 99.5% by mass, respectively. More preferably, the amounts are 1% to 50% by mass and 50% to 99% by mass, respectively.

When the fat and oil and/or the water repellent is not used for an actuator element or a layered body including the conductive thin film and electrolytic film, the amounts of the ionic liquid and polymer added to the electrolytic film are 0% to 30% by mass and 70% to 100% by mass, respectively. Preferably, the amounts are 1% to 25% by mass and 75% to 99% by mass, respectively. More preferably, the amounts are 2% to 5% by mass and 95% to 98% by mass, respectively.

The conductive thin film used in the present invention may include a conductive aid, in addition to the carbon nanotubes, ionic liquid, and polymer.

Examples of the conductive aid include conductive polymers; inorganic mesoporous materials; metal oxides such as ruthenium oxide ($RuO_2$); carbon particles such as carbon black, Ketjenblack, acetylene black, artificial graphite, carbon fiber, furnace black, channel black, lampblack, and thermal black; and gold fine particles.

The conductive aid is added in order to improve the electronic conductivity in an electrode, increase the density of a polymer network structure formed of the carbon nanotubes and polymer, and increase a force to be generated.

Examples of the conductive polymer include polyacetylene, polyaniline, polythiophene, polypyrrole, polyfluorene, polyphenylene, polyphenylene sulfide, poly(1,6-heptadiyne), polybiphenylene (polyparaphenylene), polyparaphenylene sulfide, polyphenylacetylene, poly(2,5-thienylene), polyindole, poly-2,5-diaminoanthraquinone, poly(o-phenylenediamine), poly(quinolinium) salts, poly(isoquinolinium) salts, polypyridine, polyquinoxaline, and polyphenylquinoxaline. These conductive polymers may have a substituent. Examples of the substituent include a linear or branched $C_1$ to $C_{12}$ alkyl group, a hydroxyl group, a linear or branched $C_1$ to $C_{12}$ alkoxy group, an amino group, a carboxyl group, a sulfonic acid group, a halogen group, a nitro group, a cyano group, a linear or branched $C_1$ to $C_{12}$ alkylsulfonic acid group, and a di(linear or branched $C_1$ to $C_4$ alkyl)amino group.

The inorganic mesoporous material has a structure in which one-dimensional pores are regularly arranged. The phrase "structure in which one-dimensional pores are regularly arranged" means any structure in which one-dimensional pores having a uniform pore size are regularly arranged. The phrase "regularly arranged" means that pores are aligned in a uniaxial orientation. The phrase "uniform pore size" means that the pore size of each of pores is within a certain range. The pore size can be suitably set, but is normally 1 to 30 nm and preferably 1.5 to 15 nm. The pore size can be adjusted by changing the type of surfactant. Specific examples of the structure in which one-dimensional pores are regularly arranged include a hexagonal structure, an orthorhombic structure, and a monoclinic structure.

Such an inorganic mesoporous material can be prepared by using, as a mold, a surfactant that can form a regular pore structure.

A desired material can be suitably used as the inorganic mesoporous material. Examples of the inorganic mesoporous material include silica, titania, zirconia, alumina, silica-alumina, silica-titania, tin phosphate, niobium phosphate, aluminum phosphate, titanium phosphate; oxides, nitrides, sulfides, selenides, and tellurides of the foregoing metal; and composite oxides and composite salts of the foregoing metal. Among them, silicon oxide such as silica is particularly preferred in terms of high thermal resistance, high chemical resistance, and good mechanical properties.

A preferred inorganic mesoporous material is MCM-41. MCM-41 has a regular structure (honeycomb structure) with a pore size of 2.7 nm and a specific surface area of less than 1000 $m^2/g$, which are approximately equivalent to those of carbon nanotubes. By employing MCM-41, the amount of carbon nanotubes added can be reduced, which decreases the cost, and MCM-41 can be made to function as a one-dimensional channel through which an ionic liquid can efficiently move. Although the inventors of the present invention do not like to rely on theory, they believe that an inorganic mesoporous material can be used for efficient adsorption of cations or as a mold of an electrode.

The conductive thin film used in an electrode layer of an actuator element includes carbon nanotubes, an ionic liquid, a polymer, and a conductive aid.

The amounts of the carbon nanotubes, ionic liquid, and polymer added to the conductive thin film are 3% to 90% by weight, 5% to 80% by weight, and 4% to 70% by weight, respectively. Preferably, the amounts are 16.6% to 70% by weight, 15% to 73.4% by weight, and 10% to 68.4% by weight, respectively. More preferably, the amounts are 20% to 50% by weight, 20% to 69% by weight, and 11% to 64% by weight, respectively. The conductive aid is added in an amount of 3 to 90 parts by weight, preferably 10 to 72.5 parts by weight, and more preferably 15 to 65 parts by weight relative to 100 parts by weight of the total amount of the carbon nanotubes, ionic liquid, and polymer.

Figures 2A, 2B:
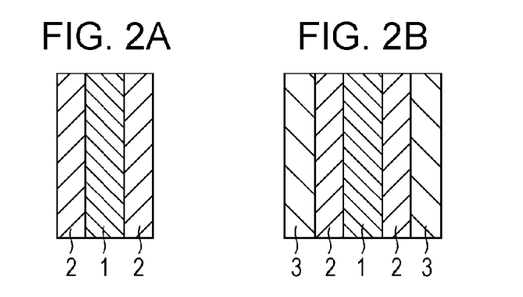
FIG. 2A schematically shows an example of an actuator element (three-layer structure) according to an embodiment of the present invention.
FIG. 2B schematically shows an example of an actuator element (five-layer structure) according to an embodiment of the present invention.

The actuator element according to an embodiment of the present invention has, for example, a three-layer structure in which an electrolytic film 1 is sandwiched between two conductive thin films (electrode layers) 2 including carbon nanotubes, an ionic liquid, and a polymer (and optionally fat and oil and/or a water repellent) (refer to FIG. 2A). The electrolytic film 1 may include fat and oil and/or a water repellent. In this case, the conductive thin film 2 does not necessarily include fat and oil and/or a water repellent. The fat and oil and/or the water repellent may be present at interfaces between the electrolytic film 1 and the two conductive thin films (electrode layers) 2.

To increase the surface conductivity of electrodes, the actuator element according to an embodiment of the present invention may have a five-layer structure in which a conductive layer 3 is further formed on each of the outer sides of the two electrode layers 2 (refer to FIG. 2B).

The actuator element can be obtained by stacking a conductive thin film on the surface of an electrolytic film. Specifically, an electrode layer-forming gel solution prepared by dispersing carbon nanotubes, an ionic liquid, and a polymer (and optionally fat and oil and/or a water repellent) in a solvent and an electrolytic film-forming gel solution composed of an ionic liquid and a polymer (and optionally fat and oil and/or a water repellent) are each cast and dried, and the formed films are alternately stacked on top of one another. Alternatively, a conductive thin film formed by casting and drying the electrode layer-forming gel solution is stacked, through thermocompression bonding, on an electrolytic film formed by casting and drying the electrolytic film-forming gel solution.

In the actuator element having the three-layer structure shown in FIG. 2A, the fat and oil and/or the water repellent can be made to be present at interfaces between the electrolytic film and the two conductive thin films in the following manner. That is, fat and oil and/or a water repellent may be applied to one of the main surfaces of each of the two conductive thin films and/or may be applied to both the surfaces of the electrolytic film. Layers of the fat and oil and/or the water repellent may be formed on both the surfaces of the electrolytic film through a single step by immersing the electrolytic film in a solution of the fat and oil and/or the water repellent and drying it.

In the present invention, when the conductive thin film including carbon nanotubes, an ionic liquid, and a polymer (and optionally fat and oil and/or a water repellent) is formed, it is important to uniformly mix the components. A solvent is preferably used to prepare a dispersion liquid containing the components uniformly mixed therein. For example, a mixed solvent of a hydrophobic solvent and a hydrophilic solvent is particularly preferably used.

Examples of the hydrophilic solvent include carbonates such as ethylene carbonate, propylene carbonate, dimethyl carbonate, diethyl carbonate, methylethyl carbonate, and butylene carbonate; ethers such as tetrahydrofuran; acetone; lower alcohols having 1 to 3 carbon atoms, such as methanol and ethanol; and acetonitrile. Examples of the hydrophobic solvent include ketones having 5 to 10 carbon atoms, such as 4-methylpentan-2-one; halogenated hydrocarbons such as chloroform and methylene chloride; aromatic hydrocarbons such as toluene, benzene, and xylene; aliphatic and alicyclic hydrocarbons such as hexane and cyclohexane; and N,N-dimethylacetamide and N-methyl-2-pyrrolidone.

A dispersion liquid used to produce the conductive thin film according to an embodiment of the present invention may be prepared by kneading an ionic liquid and carbon nanotubes (and optionally fat and oil and/or a water repellent) to form a gel and then adding a polymer and a solvent (e.g., a mixed solvent of a hydrophilic solvent and a hydrophobic solvent when the ionic liquid has hydrophilicity and a hydrophobic solvent when the ionic liquid has hydrophobicity) to the gel. Alternatively, the dispersion liquid may be prepared by mixing carbon nanotubes, an ionic liquid, and a polymer and optionally a solvent (e.g., a mixed solvent of a hydrophilic solvent and a hydrophobic solvent when the ionic liquid has hydrophilicity and a hydrophobic solvent when the ionic liquid has hydrophobicity) and fat and oil and/or a water repellent with each other without forming a gel. In this case, it is also effective to disperse the components using ultrasonic waves.

In the case where the dispersion liquid is prepared through the formation of a gel, the mass ratio of the hydrophilic solvent to the hydrophobic in the mixed solvent is preferably 20:1 to 1:10 and more preferably 2:1 to 1:5.

In the case where the dispersion liquid is prepared without forming a gel, the ratio of the hydrophilic solvent to the hydrophobic solvent is preferably 1/100 to 20/100 and more preferably 3/100 to 15/100. A single solvent can also be used and, in this case, N,N-dimethylacetamide or N-methyl-2-pyrrolidone is preferably used.

The conductive thin film is composed of a polymer gel including carbon nanotubes, an ionic liquid, and a polymer (and optionally fat and oil and/or a water repellent).

The mixing ratio (by mass) of the carbon nanotubes and ionic liquid relative to the polymer in the conductive thin film is preferably 1:2 to 4:1 and more preferably 1:1 to 3:1. Herein, a mixed solvent of a hydrophilic solvent and a hydrophobic solvent is employed. A dispersion liquid for forming conductive thin films can also be prepared by mixing carbon nanotubes and an ionic liquid to form a gel in advance and then adding a polymer and a solvent (preferably a hydrophobic solvent) to the gel. In this case, the mixing ratio of the carbon nanotubes and ionic liquid relative to the polymer is preferably 1:1 to 3:1.

The conductive thin film may contain a small amount of the solvent (hydrophobic solvent and hydrophilic solvent), but a solvent that can be removed under typical drying conditions is preferably removed in advance as much as possible.

A gel composition used to form the ion conductive layer (electrolytic film) includes a polymer and an ionic liquid that is an optional component (and optionally fat and oil and/or a water repellent). In the ion conductive layer, the mixing ratio (by mass) of a hydrophilic ionic liquid to a polymer in the gel composition is preferably 1:4 to 4:1 and more preferably 1:2 to 2:1. Also in this case, a solvent prepared by mixing a hydrophilic solvent and a hydrophobic solvent at a desired ratio is preferably used.

The ion conductive layer functioning as a separator that separates two or more conductive thin films can be formed by dissolving a polymer in a solvent and performing a typical process such as coating, printing, extrusion molding, casting, or injection molding. The ion conductive layer may be formed of substantially only a polymer or may be formed of a polymer to which an ionic liquid has been added.

The polymers used for the conductive thin film and ion conductive layer may be the same as or different from each other, but the polymers are preferably the same as each other or the characteristics thereof are preferably similar to each other in terms of the adhesion between the conductive thin film and the ion conductive layer.

The thickness of the electrolytic film is preferably 5 to 200 µm and more preferably 10 to 100 µm. The thickness of the conductive thin film is preferably 10 to 500 µm and more preferably 50 to 300 µm. The electrolytic film and conductive thin film can also be formed by spin coating, printing, spraying, extrusion molding, injection molding, or the like.

In the thus-obtained actuator element, when a direct-current voltage of 0.5 to 4 V is applied between electrodes (which are connected to the conductive thin films), a displacement that is about 0.05 to 1 times the length of the actuator element can be obtained within several seconds. The actuator element can operate in a flexible manner in air or vacuum.

Figure 3:
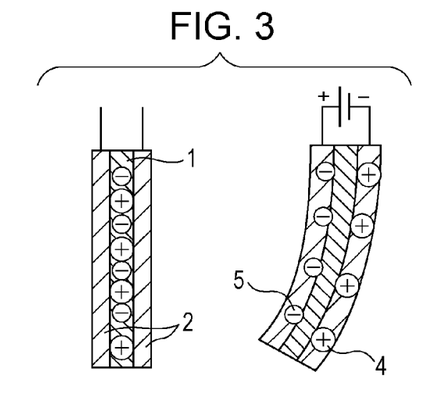
FIG. 3 shows the operating principle of the actuator element according to an embodiment of the present invention.

FIG. 3 shows the operating principle of the actuator element. When a potential difference is applied between the two conductive thin films 2 formed on the two surfaces of the electrolytic film 1 so as to be insulated from each other, an electric double layer is formed at an interface between a carbon nanotube phase and an ionic liquid phase in each of the two conductive thin films 2. As a result, the two conductive thin films 2 expand and contract due to the interfacial stress caused by the electric double layer. As shown in FIG. 3, the actuator element bends toward the positive electrode side. This may be because carbon nanotubes significantly expand on the negative electrode side due to quantum chemical effects, and the ionic radius of cations 4 in an ionic liquid often used at present is large and the conductive thin film 2 on the negative electrode side expands more than that on the positive electrode side due to its steric effect. In FIG. 3, the reference numeral 4 indicates a cation in the ionic liquid and the reference numeral 5 indicates an anion in the ionic liquid.

According to the actuator element that can be obtained by the method above, the effective area of a gel at an interface between the carbon nanotubes and the ionic liquid is significantly increased and thus the impedance at the electric double layer at the interface is decreased. Consequently, the electrically-expanding-and-contracting effects of the carbon nanotubes can be effectively utilized. From a mechanical point of view, the adhesion between the conductive thin film and the electrolytic film at the interface is improved and thus the actuator element has high durability. As a result, an actuator element having quick response and a large amount of displacement in air or vacuum and having high durability can be obtained. In addition, such an actuator element has a simple structure, is easily downsized, and can be operated with low power consumption. Furthermore, by adding a conductive additive to the carbon nanotubes, the conductivity and filling factor (packing density) of an electrode layer are improved and a force is efficiently generated compared with typical actuator elements of the same type.

The actuator element according to an embodiment of the present invention has high durability in air or vacuum and operates at low voltage in a flexible manner. Therefore, the actuator element can be suitably used for actuators of robots that work for human beings and thus need to have high safety (e.g., actuators of personal robots such as house robots, pet robots, and amusement robots); actuators of robots that operate in special environments, for example, in a space environment, in a vacuum chamber, and in a rescue situation; actuators of medical and welfare robots used for operation devices, muscle suits, and bedsore prevention; and actuators of brakes and micromachines.

In particular, to produce products with high purity in a vacuum environment or an ultra-clean environment, a demand for actuators used for the conveyance and positioning of samples has been growing. The actuator element according to an embodiment of the present invention that uses a non-volatile ionic liquid can be effectively used for actuators that cause no contamination and operate in a vacuum environment.

Figure 4:
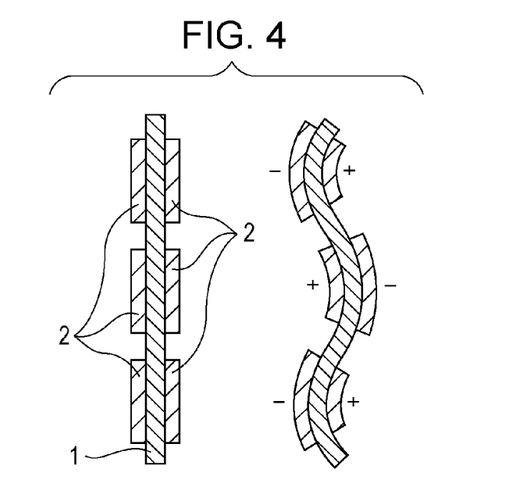
FIG. 4 schematically shows another example of the actuator element according to an embodiment of the present invention.
Figure 5A:
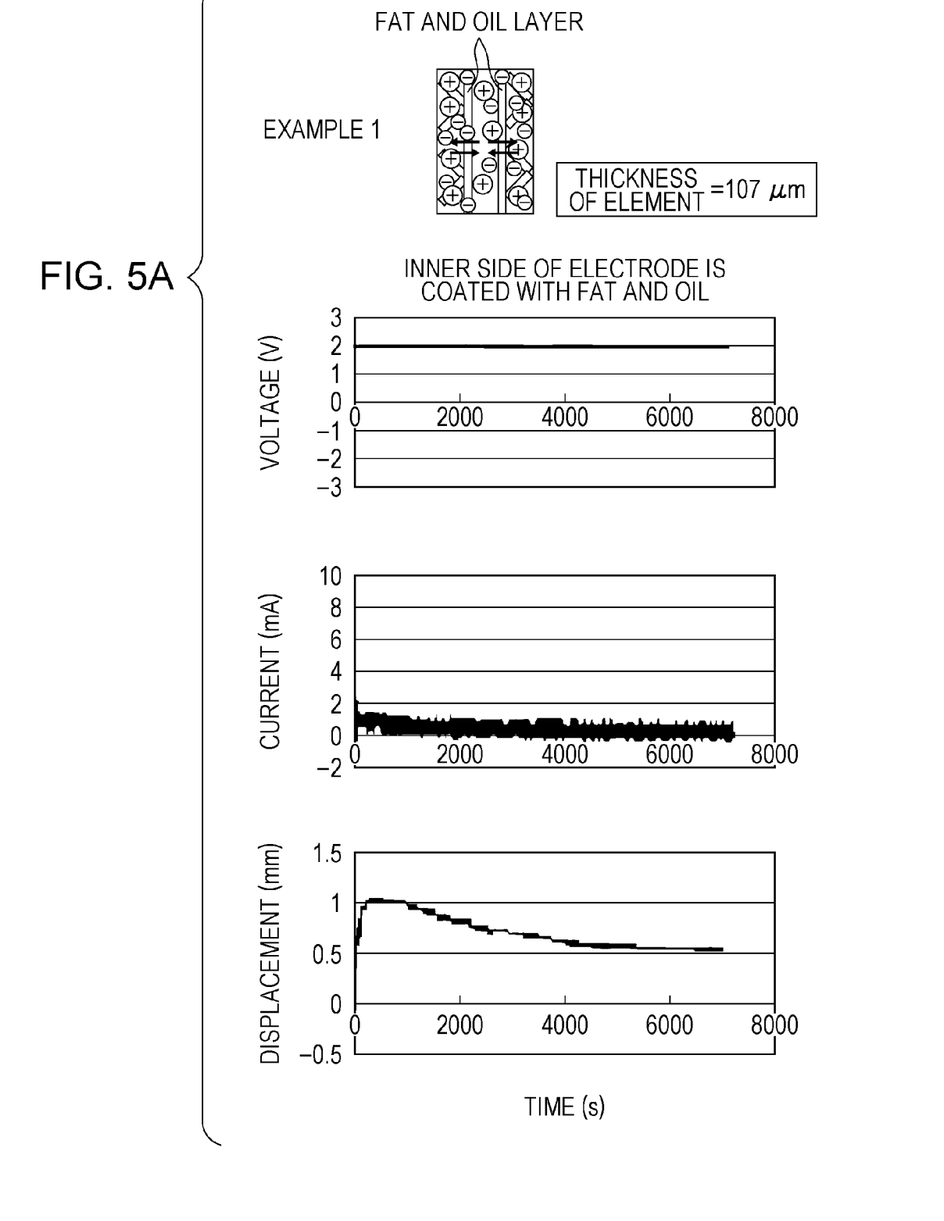
FIGS. 5A to 5C show that the return after deformation is suppressed and the amount of deformation is improved by using fat and oil or a water repellent.
Figure 5B:
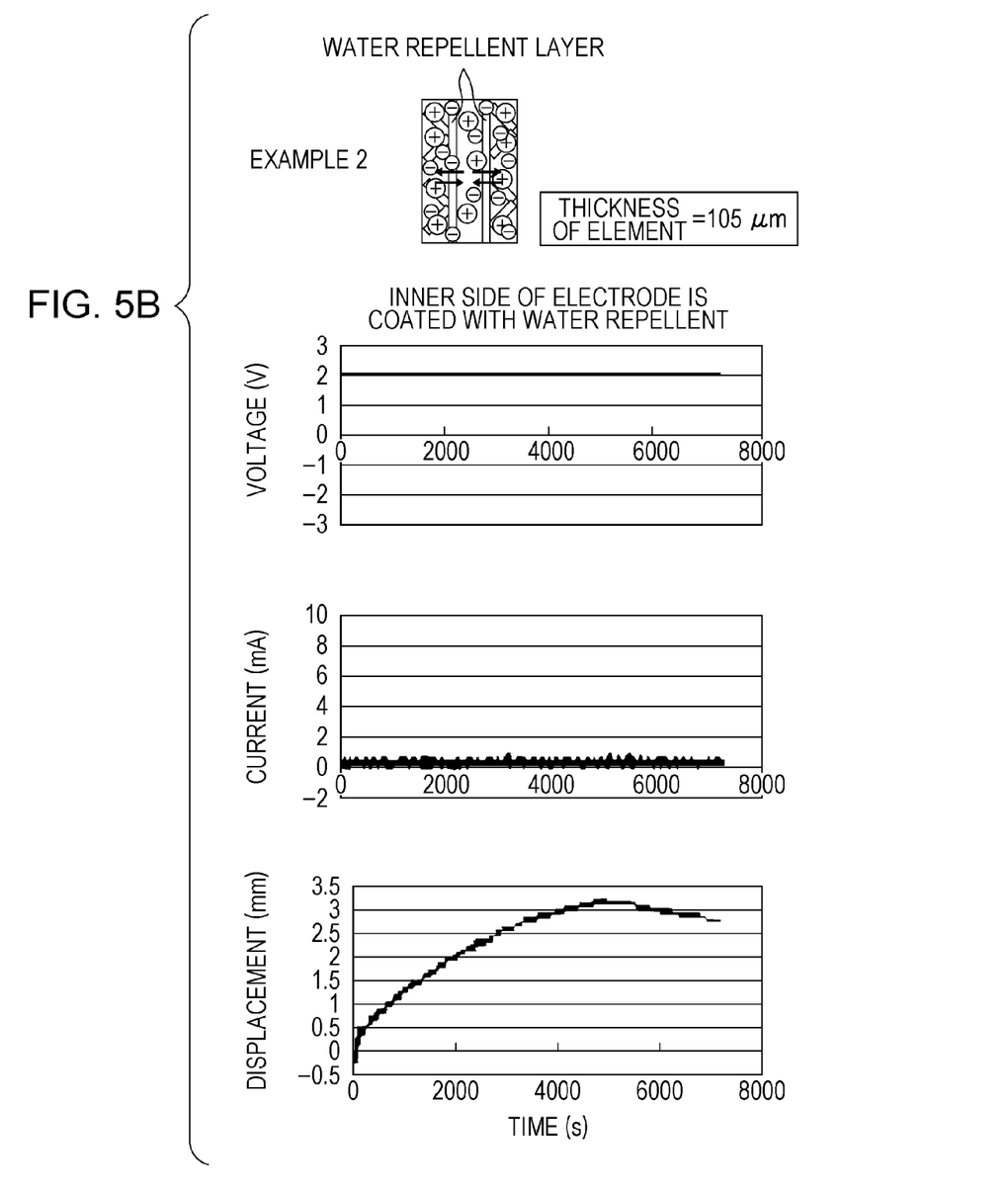
Figure 5C:
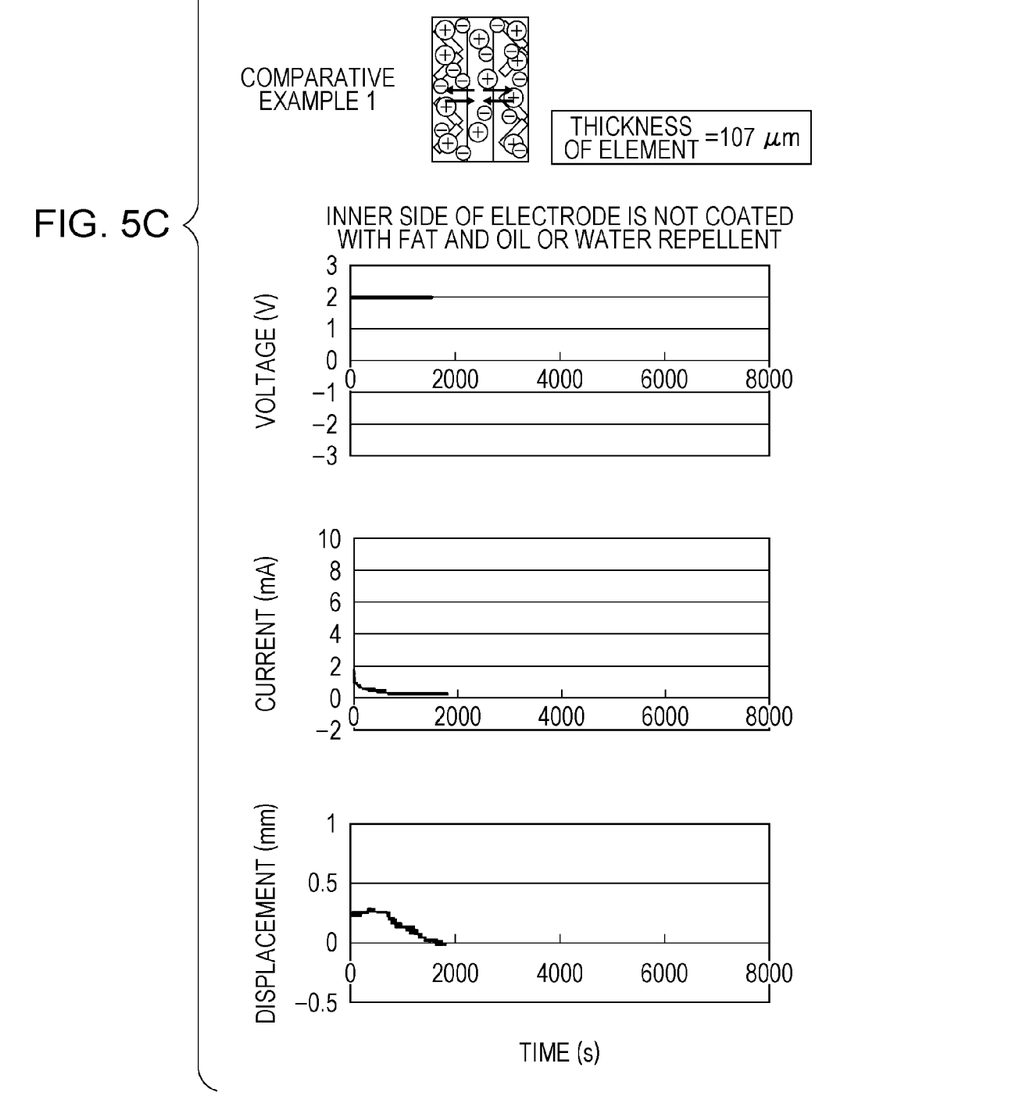
Figure 6A:
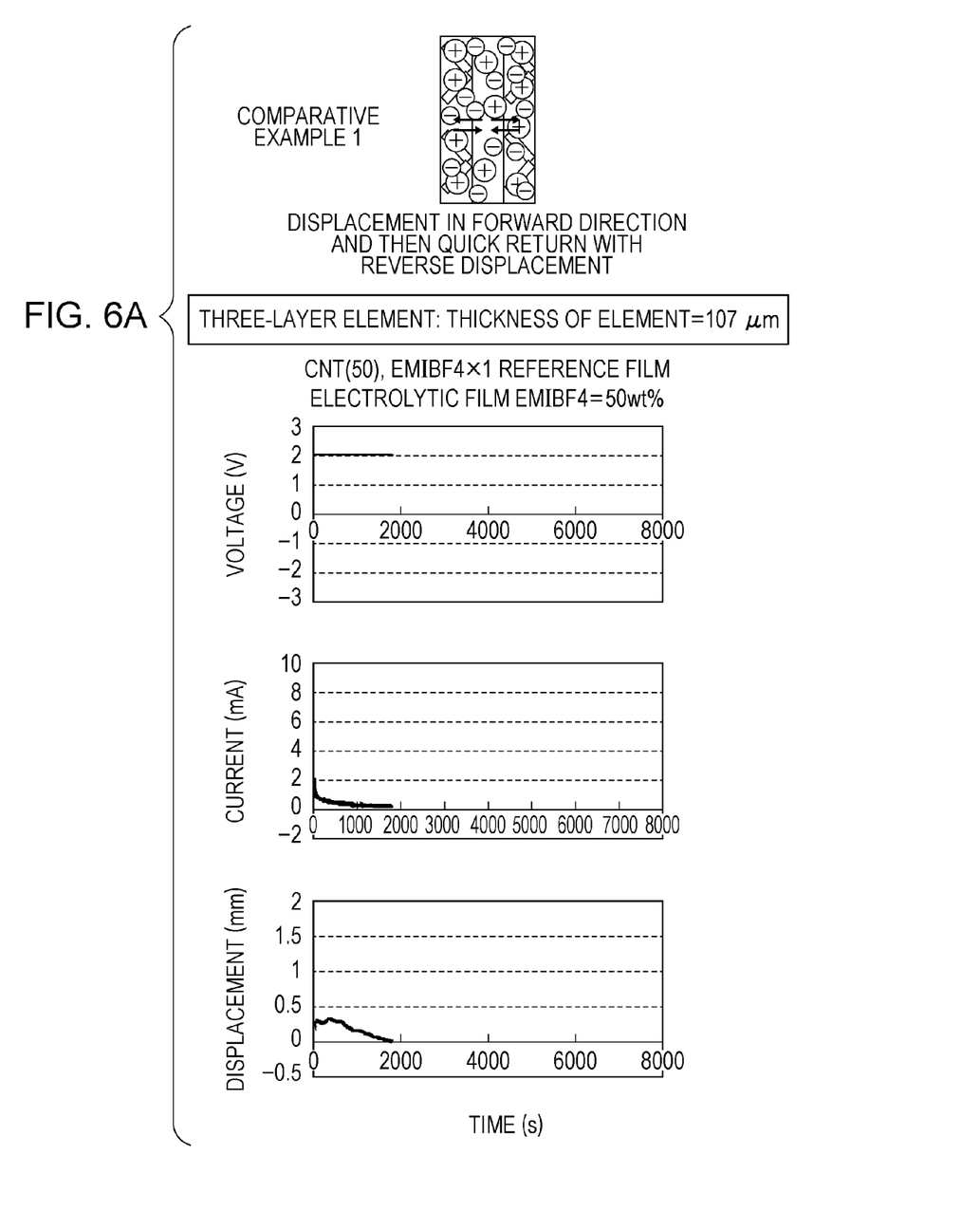
FIGS. 6A to 6F show that the return after deformation is suppressed and the amount of deformation is improved by adjusting the content of an ionic liquid in an electrolytic film.
Figure 6B:
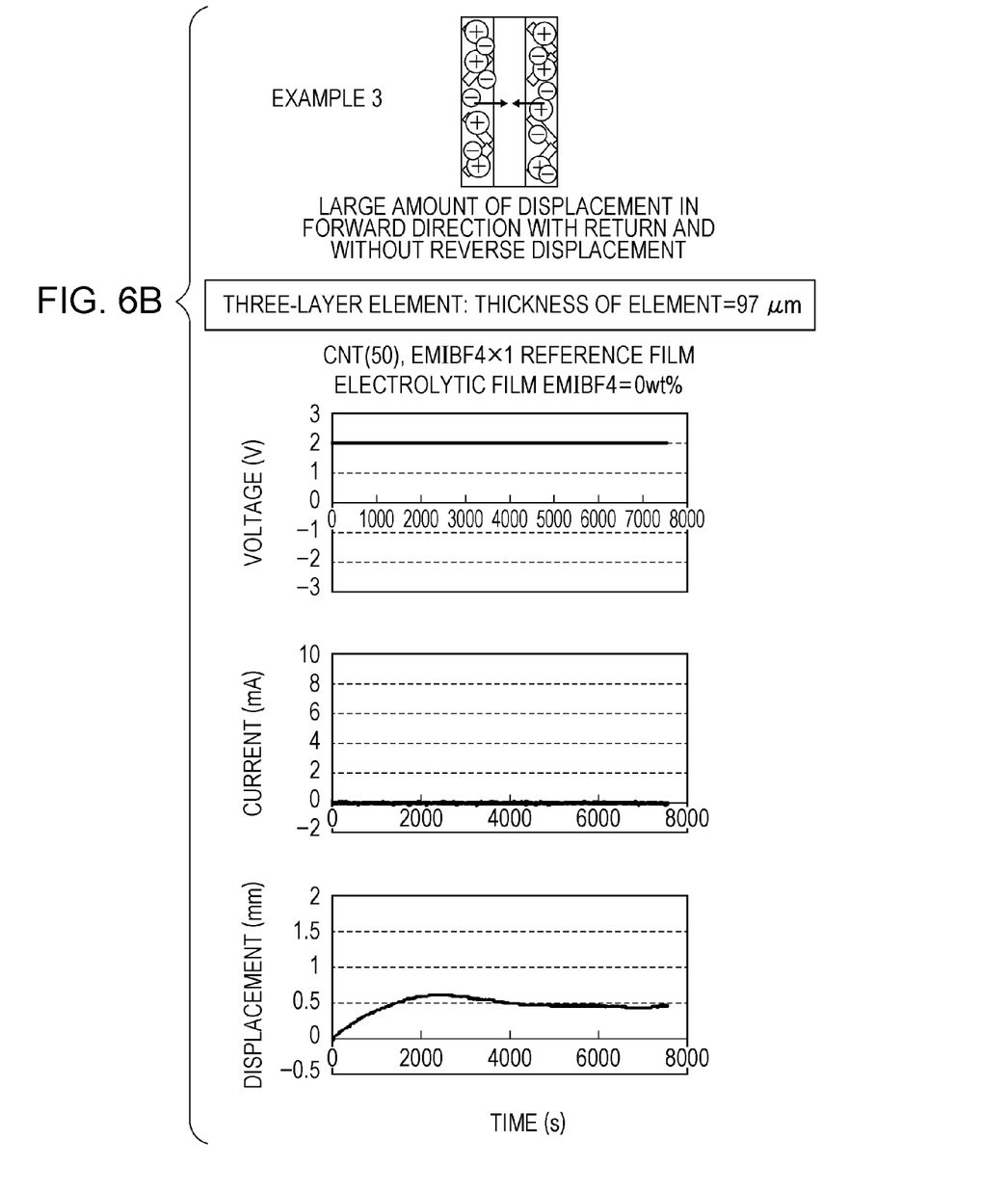
Figure 6C:
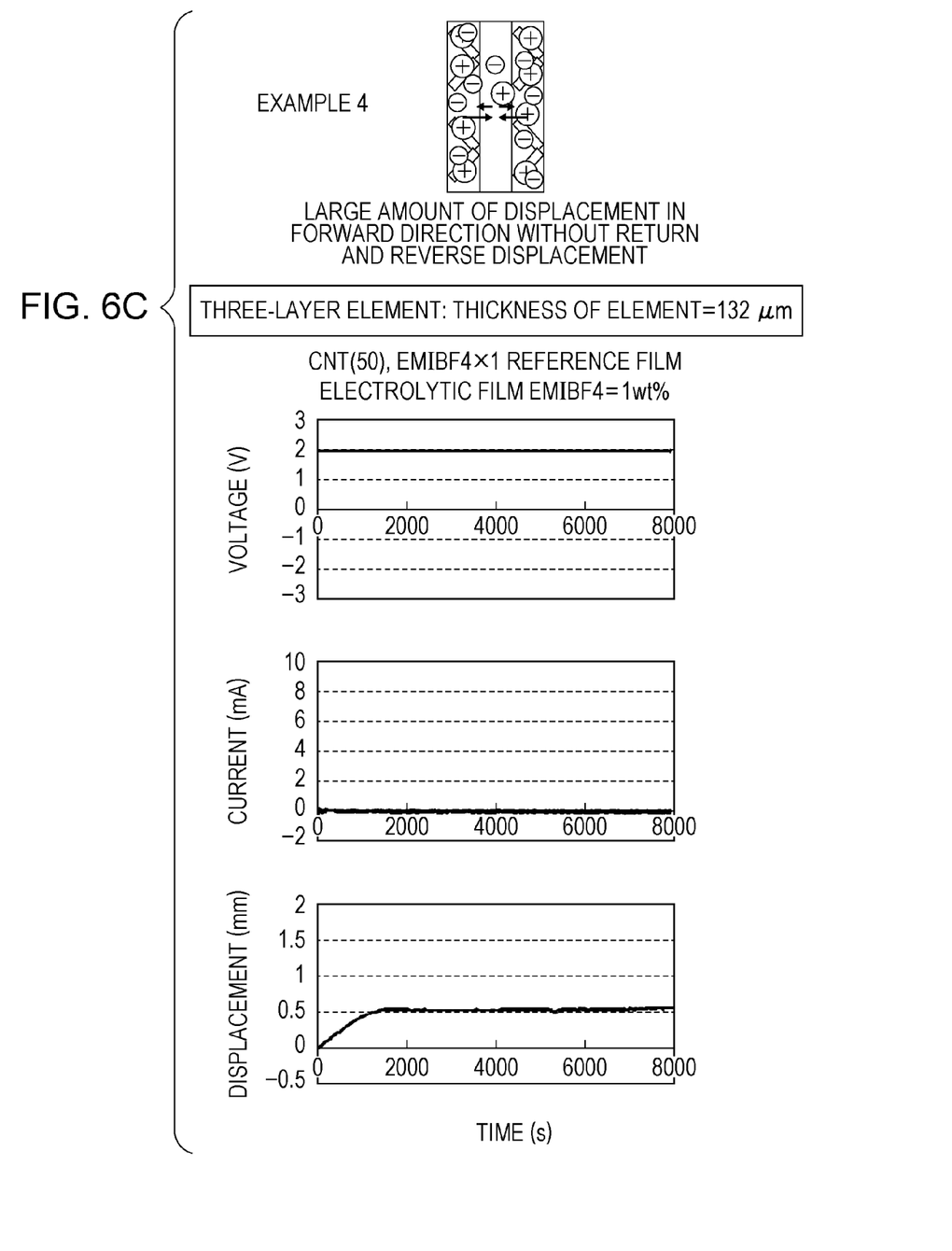
Figure 6D:
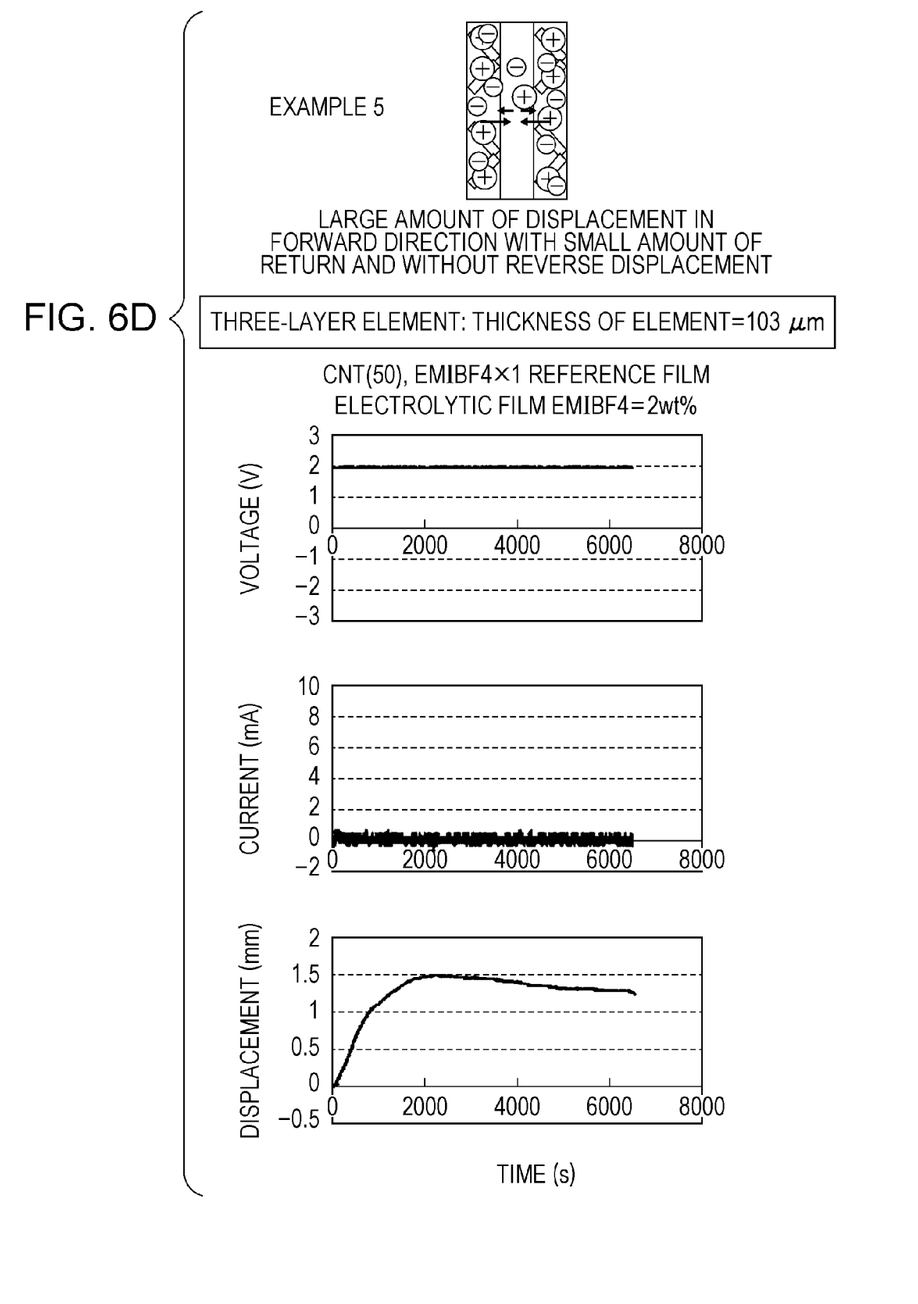
Figure 6E:
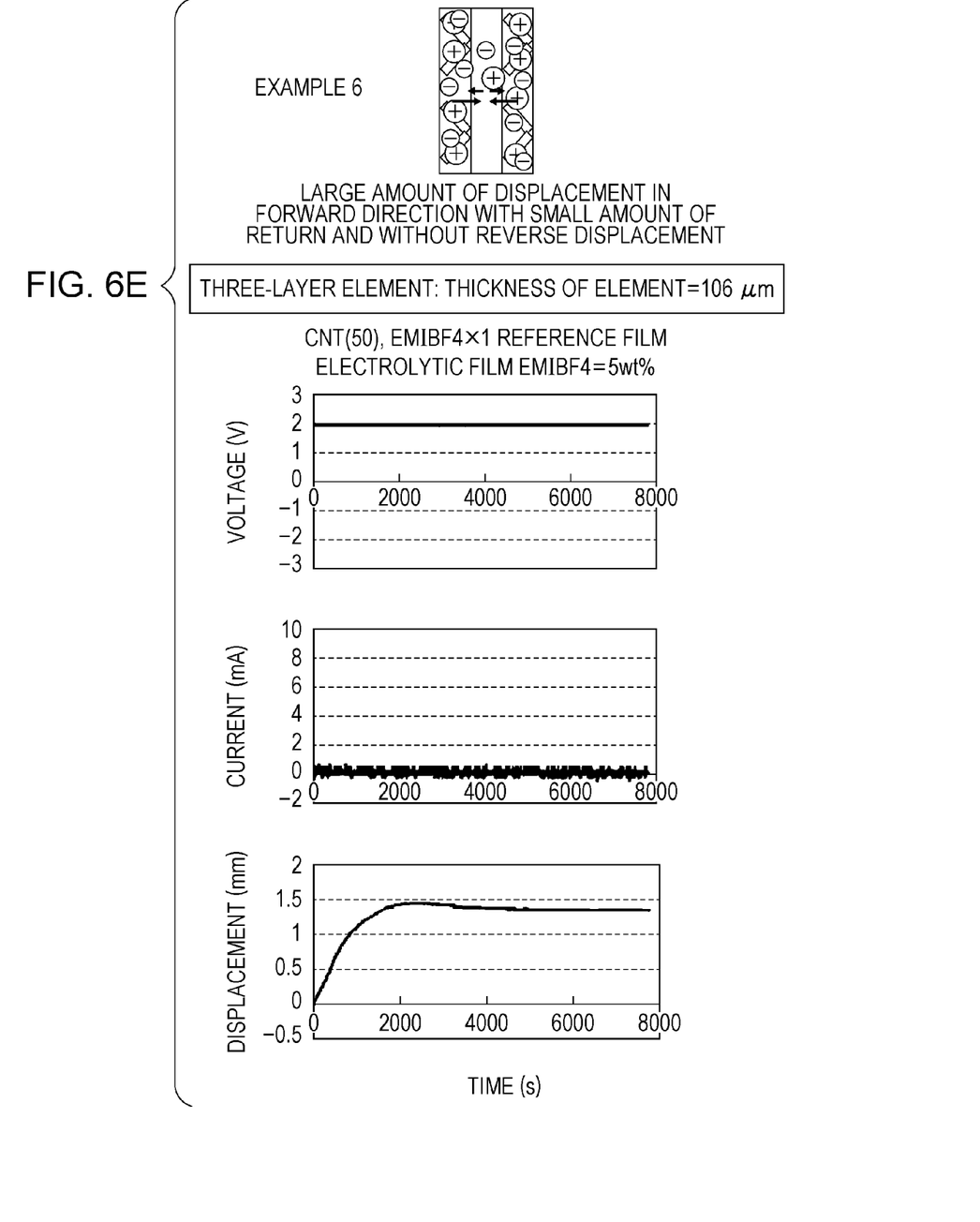
Figure 6F:
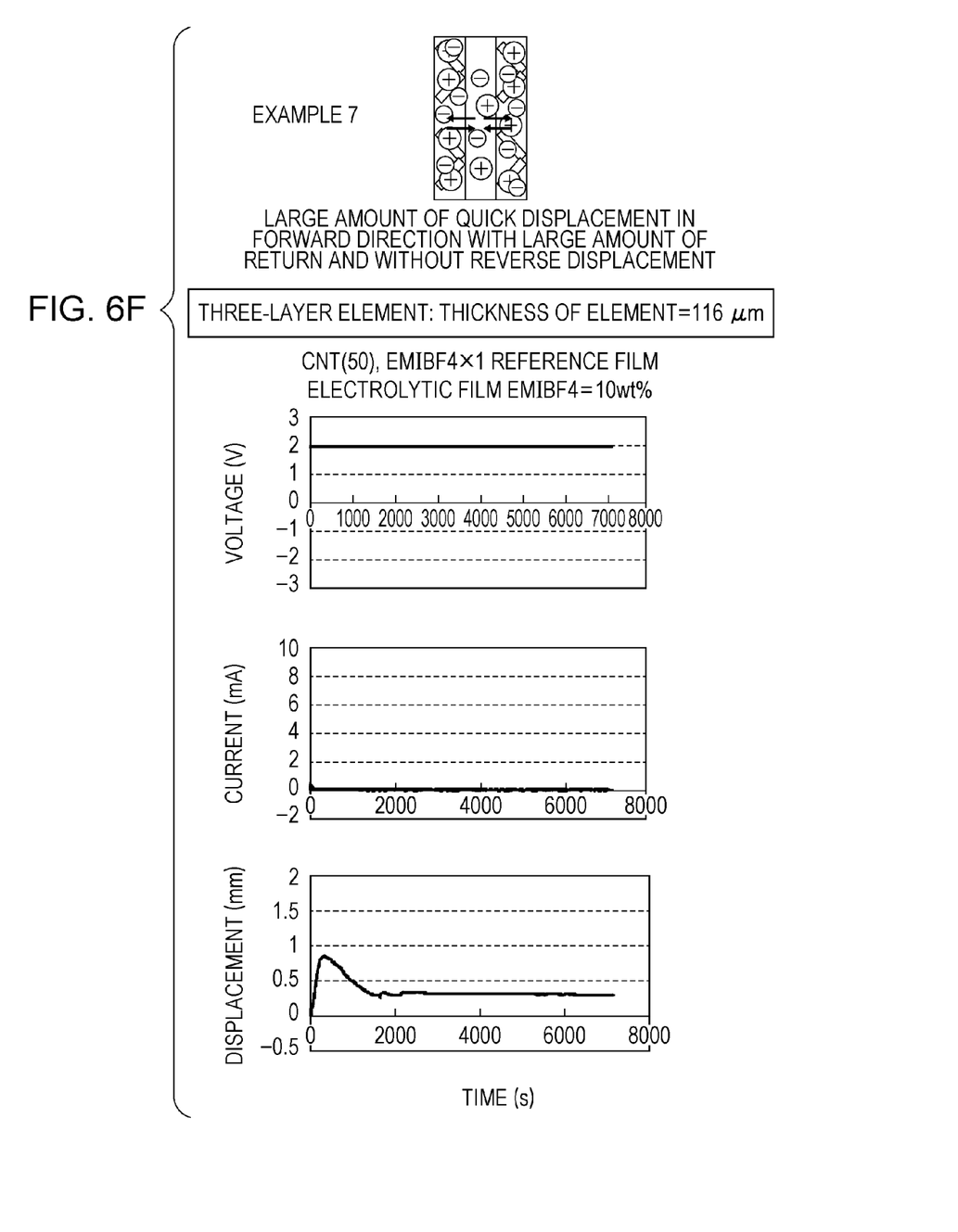

At least two conductive thin films need to be formed on the surfaces of the electrolytic film. As shown in FIG. 4, a large number of conductive thin films 2 can be disposed on the surfaces of a planar electrolytic film 1 to achieve a complicated motion. Such an actuator element can realize the conveyance that uses peristaltic movement and can provide a micromanipulator. The shape of the actuator element according to an embodiment of the present invention is not limited to a planar shape, and an actuator element having any shape can be easily produced. For example, an actuator element may include a rod-shaped electrolytic film having a diameter of about 1 mm and four conductive thin films formed around the electrolytic film. By using the actuator element, an actuator that can be inserted into a thin tube can be realized.

EXAMPLES

The present invention will now be described in detail based on Examples, but is obviously not limited to Examples.

In Examples, the displacement of an actuator element was evaluated as follows.

Figure 1:
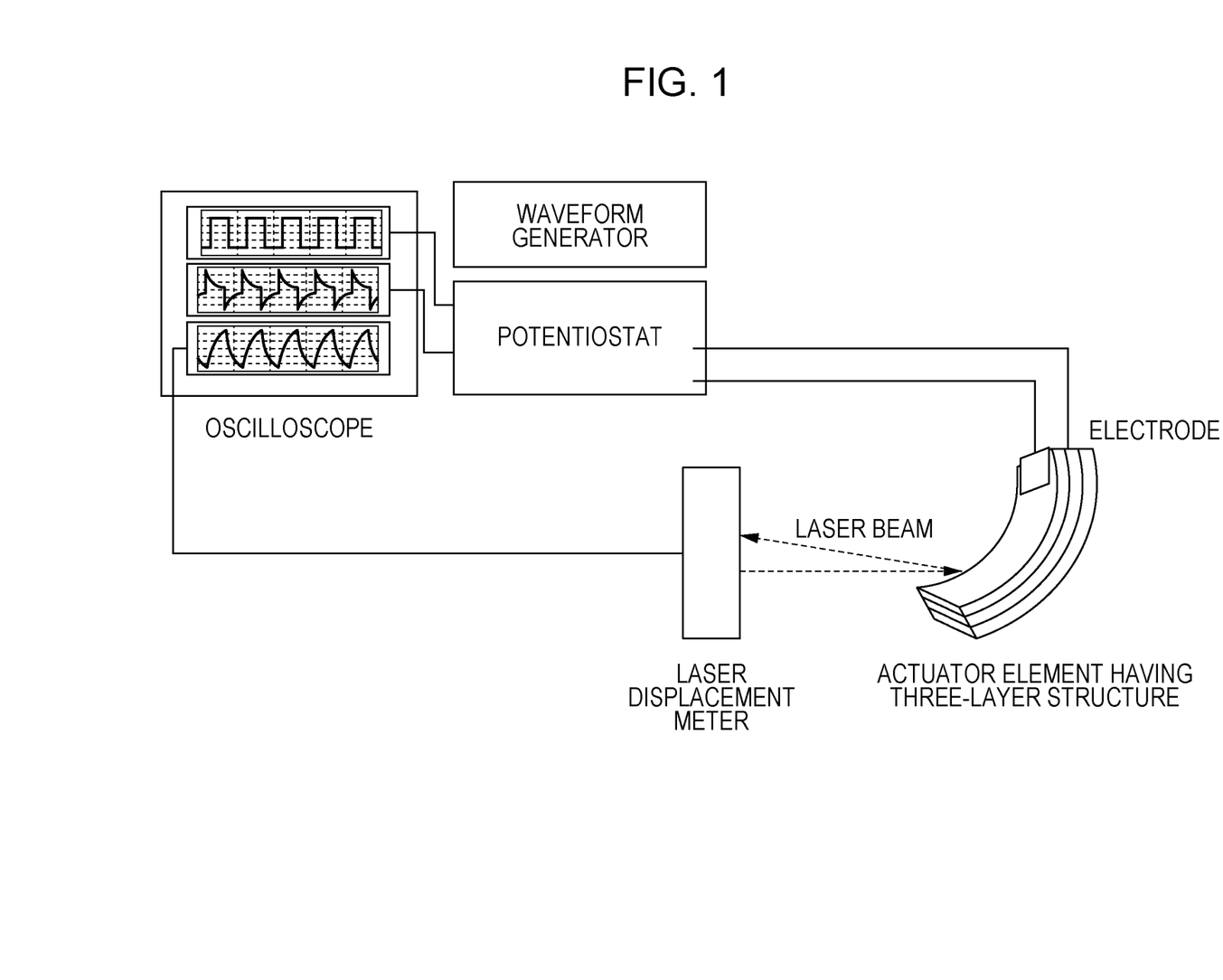
FIG. 1 shows a displacement measuring system including a laser displacement meter that is used in a method for evaluating the displacement of an actuator element in Examples of the present invention.

That is, an actuator element was cut into rectangles having a size of 1 mm×10 mm or 2 mm×10 mm, and a displacement, at a position 5 mm from one end, caused when a voltage was applied was measured with a laser displacement meter shown in FIG. 1.

The ionic liquid (IL) used in Examples 1 to 7 and Comparative Example 1 was ethylmethylimidazolium tetrafluoroborate ($EMIBF_4$).

The carbon nanotubes used in Examples 1 to 7 and Comparative Example 1 were purified-grade single-walled carbon nanotubes (hereinafter also referred to as "SWCNTs") ("HiPco" manufactured by Unidym).

The polymer used in Examples 1 to 7 and Comparative Example 1 was a polyvinylidene fluoride-hexafluoropropylene (PVDF(HFP)) copolymer (product name: kynar 2801) represented by formula (III) below.

(III)

The solvent used in Examples 1 to 7 and Comparative Example 1 was N,N-dimethylacetamide (DMAC).

The fat and oil used in Examples 1 to 7 was salad oil (manufactured by The Nisshin OilliO Group, Ltd.).

The water repellent used in Examples 1 to 7 was Scotchgard (product name) manufactured by Sumitomo 3M Limited.

Preparation Example 1

Preparation of Dispersion Liquid for Forming Conductive Thin Films

The carbon nanotubes (SWCNTs), the ionic liquid (IL), and the polymer (powdery PVDF(HFP)) were dispersed in the DMAC solvent, stirred with a magnetic stirrer, and then dispersed using ultrasonic waves to prepare a dispersion liquid for forming conductive thin films.
[Preparation of Solution for Forming Electrolytic Films]

The ionic liquid (IL) and the polymer (powdery PVDF (HFP)) were dissolved in a solvent in a manner similar to that of the dispersion liquid for forming conductive thin films to prepare a solution for forming electrolytic films. The solvent used herein was a mixed solvent of 4-methylpentan-2-one and propylene carbonate.
[Production of Actuator Element]

The dispersion liquid and solution prepared as described above were separately cast, dried at room temperature for about twenty-for hours, and then vacuum-dried to form a conductive thin film and an electrolytic film, respectively. The fat and oil or the water repellent was applied to the surfaces of two conductive thin films to form fat and oil layers or water repellent layers. The electrolytic film was sandwiched between the two conductive thin films so that the fat and oil layers or water repellent layers of the two conductive thin films face the electrolytic film. Subsequently, thermocompression bonding (fabrication by heat-pressing) was performed to produce an actuator element having a three-layer structure.
[Evaluation Method of Actuator Element]

The displacement response of the produced actuator element was evaluated with the system shown in FIG. 1. The actuator element was cut into rectangles having a width of 2 mm and a length of 10 mm. A portion 3 mm from one end of each of the rectangles was gripped with a holder also functioning as an electrode. A displacement, at a position 5 mm from the gripped end, caused when a voltage was applied in air was measured with the laser displacement meter. The frequency of the voltage was changed from 5 mHz to 200 Hz. The long-term durability of the actuator element was evaluated by continuously applying a constant voltage of +2.0 V.

Examples 1 and 2

Coating with Fat and Oil or Water Repellent

A film-like actuator element having a five-layer structure of conductive thin film (electrode)-(fat and oil layer or water repellent layer)-electrolytic film-(fat and oil layer or water repellent layer)-conductive thin film (electrode) was produced using the carbon nanotubes (SWCNTs), ionic liquid ($EMIBF_4$), and polymer (PVDF(HFP), kynar 2801) at the ratios shown below. The fat and oil (weight: 0.12 mg) (Example 1) or the water repellent (weight: 1.0 mg) (Example 2) was applied to one of the main surfaces of each of the two conductive thin films, and compression bonding (heat-pressing) was performed so that the fat and oil layer or the water repellent layer faced the electrolytic film.
Composition of conductive thin film: SWCNT/PVDF(HFP)/ $EMIBF_4$=50.2 mg/80.1 mg/120.2 mg Composition ratio of conductive thin film: SWCNT/PVDF(HFP)/EMIBF$_4$=20.04 wt %/31.98 wt %/47.98 wt %
Composition of electrolytic film: PVDF(HFP)/EMIBF$_4$=200.3 mg/200.1 mg
Composition ratio of electrolytic film: PVDF(HFP)/EMIBF$_4$=50.02 wt %/49.98 wt %

Example 3

The Case where the Conductive Thin Film has the Same Composition as that of the Reference Film in Examples 1 and 2 and the Content of the Ionic Liquid in the Electrolytic Film is 0 wt %

A film-like actuator element having a three-layer structure of conductive thin film (electrode)-electrolytic film-conductive thin film (electrode) was produced as an actuator element of Example 3 using the carbon nanotubes (SWCNTs), ionic liquid (EMIBF$_4$), and polymer (PVDF(HFP), kynar 2801) at the ratios shown below.
Composition of conductive thin film: SWCNT/PVDF(HFP)/EMIBF$_4$=50.1 mg/80.1 mg/120.5 mg
Composition ratio of conductive thin film: SWCNT/PVDF(HFP)/EMIBF$_4$=19.98 wt %/31.95 wt %/48.07 wt %
Composition of electrolytic film: PVDF(HFP)/EMIBF$_4$=200.1 mg/0.0 mg
Composition ratio of electrolytic film: PVDF(HFP)/EMIBF$_4$=100.00 wt %/0.00 wt %

Example 4

The Case where the Conductive Thin Film has the Same Composition as that of the Reference Film in Examples 1 and 2 and the Content of the Ionic Liquid in the Electrolytic Film is 1 wt %

A film-like actuator element having a three-layer structure of conductive thin film (electrode)-electrolytic film-conductive thin film (electrode) was produced as an actuator element of Example 4 using the carbon nanotubes (SWCNTs), ionic liquid (EMIBF$_4$), and polymer (PVDF(HFP), kynar 2801) at the ratios shown below.
Composition of conductive thin film: SWCNT/PVDF(HFP)/EMIBF$_4$=25.26 mg/40.4 mg/60.2 mg
Composition ratio of conductive thin film: SWCNT/PVDF(HFP)/EMIBF$_4$=20.07 wt %/32.10 wt %/47.83 wt %
Composition of electrolytic film: PVDF(HFP)/EMIBF$_4$=200.3 mg/2.1 mg
Composition ratio of electrolytic film: PVDF(HFP)/EMIBF$_4$=98.96 wt %/1.04 wt %

Example 5

The Case where the Conductive Thin Film has the Same Composition as that of the Reference Film in Examples 1 and 2 and the Content of the Ionic Liquid in the Electrolytic Film is 2 wt %

A film-like actuator element having a three-layer structure of conductive thin film (electrode)-electrolytic film-conductive thin film (electrode) was produced as an actuator element of Example 5 using the carbon nanotubes (SWCNTs), ionic liquid (EMIBF$_4$), and polymer (PVDF(HFP), kynar 2801) at the ratios shown below.
Composition of conductive thin film: SWCNT/PVDF(HFP)/EMIBF$_4$=50.1 mg/80.1 mg/120.4 mg
Composition ratio of conductive thin film: SWCNT/PVDF(HFP)/EMIBF$_4$=19.99 wt %/31.96 wt %/48.04 wt %
Composition of electrolytic film: PVDF(HFP)/EMIBF$_4$=200.1 mg/4.1 mg
Composition ratio of electrolytic film: PVDF(HFP)/EMIBF$_4$=97.99 wt %/2.01 wt %

Example 6

The Case where the Conductive Thin Film has the Same Composition as that of the Reference Film in Examples 1 and 2 and the Content of the Ionic Liquid in the Electrolytic Film is 5 wt %

A film-like actuator element having a three-layer structure of conductive thin film (electrode)-electrolytic film-conductive thin film (electrode) was produced as an actuator element of Example 6 using the carbon nanotubes (SWCNTs), ionic liquid (EMIBF$_4$), and polymer (PVDF(HFP), kynar 2801) at the ratios shown below.
Composition of conductive thin film: SWCNT/PVDF(HFP)/EMIBF$_4$=50.1 mg/80.1 mg/120.4 mg
Composition ratio of conductive thin film: SWCNT/PVDF(HFP)/EMIBF$_4$=19.99 wt %/31.96 wt %/48.04 wt %
Composition of electrolytic film: PVDF(HFP)/EMIBF$_4$=200.4 mg/10.8 mg
Composition ratio of electrolytic film: PVDF(HFP)/EMIBF$_4$=94.89 wt %/5.11 wt %

Example 7

The Case where the Conductive Thin Film has the Same Composition as that of the Reference Film in Examples 1 and 2 and the Content of the Ionic Liquid in the Electrolytic Film is 10 wt %

A film-like actuator element having a three-layer structure of conductive thin film (electrode)-electrolytic film-conductive thin film (electrode) was produced as an actuator element of Example 7 using the carbon nanotubes (SWCNTs), ionic liquid (EMIBF$_4$), and polymer (PVDF(HFP), kynar 2801) at the ratios shown below.
Composition of conductive thin film: SWCNT/PVDF(HFP)/EMIBF$_4$=25.26 mg/40.4 mg/60.2 mg
Composition ratio of conductive thin film: SWCNT/PVDF(HFP)/EMIBF$_4$=20.07 wt %/32.10 wt %/47.83 wt %
Composition of electrolytic film: PVDF(HFP)/EMIBF$_4$=200.3 mg/22.3 mg
Composition ratio of electrolytic film: PVDF(HFP)/EMIBF$_4$=89.98 wt %/10.02 wt %

Comparative Example 1

A film-like actuator element having a three-layer structure of conductive thin film (electrode)-electrolytic film-conductive thin film (electrode) was produced as an actuator element of Comparative Example 1 using the carbon nanotubes (SWCNTs), ionic liquid (EMIBF$_4$), and polymer (PVDF(HFP), kynar 2801) at the ratios shown below.
Composition of conductive thin film: SWCNT/PVDF(HFP)/EMIBF$_4$=50.1 mg/80.1 mg/120.5 mg
Composition ratio of conductive thin film: SWCNT/PVDF(HFP)/EMIBF$_4$=19.98 wt %/31.95 wt %/48.07 wt %
Composition of electrolytic film: PVDF(HFP)/EMIBF$_4$=200.2 mg/200.3 mg Composition ratio of electrolytic film: PVDF(HFP)/EMIBF$_4$=49.99 wt %/50.01 wt %

Test Example 1

The response of each of the actuator elements produced in Examples 1 to 7 and Comparative Example 1 when a voltage was applied was evaluated by the above-described method for evaluating an actuator element. FIGS. 5A to 5C and 6A to 6F show the results.

As is clear from the results shown in FIGS. 5A to 5C and 6A to 6F, the return after deformation was suppressed in the actuator element according to an embodiment of the present invention in which a fat and oil layer or a water repellent layer was formed and in the actuator element according to an embodiment of the present invention in which the content of an ionic liquid in the electrolytic film was 0% to 10% by mass. In the case where the content of the ionic liquid in the electrolytic film was adjusted, when the content of the ionic liquid was 2% to 5% by mass, the return after deformation was significantly suppressed. In addition, the maximum displacement increased two to six times.

What is claimed is:

1. A layered body, comprising:
   at least one conductive thin film comprising a polymer gel comprising carbon nanotubes, an ionic liquid, and a polymer; and
   at least one electrolytic film comprising an ionic liquid and a polymer, the electrolytic film being stacked on the conductive thin film,
   wherein a layer consisting of at least one selected from the group consisting of (i) fat and oil, and (ii) a water repellent is present at the interface between the at least one conductive thin film and the at least one electrolytic film.

2. The layered body according to claim 1, wherein the fat and oil is selected from the group consisting of salad oil, shirashime oil, corn oil, soybean oil, sesame oil, rapeseed oil, rice oil, rice-bran oil, camellia oil, safflower oil, palm kernel oil, coconut oil, cottonseed oil, sunflower oil, perilla oil, olive oil, peanut oil, almond oil, avocado oil, hazelnut oil, walnut oil, grape seed oil, mustard oil, lettuce oil, fish oil, whale oil, shark oil, cod-liver oil, a glycerol fatty acid ester, a polyglycerol fatty acid ester, a sucrose fatty acid ester, an ethylene fatty acid ester, a propylene glycol fatty acid ester, a sorbitan fatty acid ester, a polyoxyethylene fatty acid ester, a polyoxyethylene sorbitan fatty acid ester, a polyoxyethylene sorbitol fatty acid ester, a polyoxyethylene lanolin fatty acid ester, a trimethylolpropane fatty acid ester, beeswax, rice wax, hydrogenated fat and oil, a polyglycerol condensed (poly) ricinoleic acid ester, phospholipid, lecithin, egg yolk lecithin, lysolecithin, soybean lecithin, an organic acid monoglyceride, a polyoxyethylene alkyl ether, polyoxyethylene castor oil, sodium stearoyl lactate, calcium stearoyl lactate, saponin, quillaia saponin, succinic acid monoglyceride, and succinic acid diglyceride.

3. The layered body according to claim 1, wherein the water repellent is at least one selected from the group consisting of fluorine-based oil, fluorosilicone oil, and silicone oil.

4. The layered body according to claim 1, wherein the conductive thin film further includes a conductive aid.

5. The layered body according to claim 4, wherein the conductive aid is selected from the group consisting of a conductive polymer, carbon particles, and an inorganic mesoporous material.

6. An actuator element comprising the layered body according to claim 1.

\* \* \* \* \*